(12) United States Patent
Lin et al.

(10) Patent No.: US 7,443,610 B1
(45) Date of Patent: Oct. 28, 2008

(54) LENS SYSTEM

(75) Inventors: Chun-Ling Lin, Taipei Hsien (TW); Chun-Hsiang Huang, Taipei Hsien (TW); Chung Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/952,962

(22) Filed: Dec. 7, 2007

(30) Foreign Application Priority Data

Sep. 6, 2007 (CN) .................... 2007 1 0201605

(51) Int. Cl.
*G02B 13/18* (2006.01)
*G02B 9/60* (2006.01)

(52) U.S. Cl. .................. 359/714; 359/740; 359/767

(58) Field of Classification Search ................ 359/714, 359/740, 767
See application file for complete search history.

(56) References Cited

U.S. PATENT DOCUMENTS

| 4,076,390 | A | * | 2/1978 | Fleischman | 359/767 |
|---|---|---|---|---|---|
| 4,458,991 | A | * | 7/1984 | Yamada | 359/767 |
| 4,575,198 | A | * | 3/1986 | Tanaka | 359/745 |
| 4,830,478 | A | * | 5/1989 | Yamakawa et al. | 359/714 |
| 6,445,513 | B2 | * | 9/2002 | Sato | 359/763 |
| 7,110,188 | B2 | * | 9/2006 | Matsui et al. | 359/714 |

* cited by examiner

*Primary Examiner*—Evelyn A. Lester

(57) ABSTRACT

A lens system comprises a first lens positive in power, a second lens positive in power, a third lens negative in power, a fourth lens positive in power, and a fifth lens negative in power. The lens system meets a criteria of $1.6<TT/f<1.8$, $1.6<f/f_2<1.8$, and $-0.6<f/f_5<-0.4$, wherein TT denotes a distance between an object-side surface of the first lens and an image plane of the lens system; $f_2$ denoting an effective focal length of the second lens; f denoting an effective focal length of the entire lens system.

11 Claims, 10 Drawing Sheets

LENS SYSTEM

TECHNICAL FIELD

The present invention relates to a lens system, and particularly to a lens system for use in electronic devices.

DESCRIPTION OF RELATED ART

In recent years, camera modules using an image sensor like a charged coupled device (CCD) or a complementary metal oxide semiconductor (CMOS) for capturing images have begun to be incorporated in portable electronic devices such as mobile phones and laptop computers. Downsizing the camera modules is a prerequisite for enhancing the portability of these electronic devices.

Therefore, it is desirable to provide a lens system with short length, compact size, excellent optical performance, and great image quality. Obtaining a short length requires very short distance between the first lens and the image plane of the lens system.

SUMMARY

In accordance with a present embodiment, a lens system comprising a first lens positive in power, a second lens positive in power, a third lens negative in power, a fourth lens positive in power, and a fifth lens negative in power is shown. The lens system meets a criteria of $1.6<TT/f<1.8$, $1.6<f/f_2<1.8$, and $-0.6<f/f_5<-0.4$, wherein TT denotes a distance between an object-side surface of the first lens and an image plane of the lens system; $f_2$ denoting an effective focal length of the second lens; $f_5$ denoting an effective focal length of the second lens; and f denoting an effective focal length of the entire lens system.

Other advantages and novel features will be drawn from the following detailed description of at least one preferred embodiment, when considered conjunction with the attached drawings.

BRIEF DESCRIPTION OF THE DRAWINGS

Many aspects of the present lens system can be better understood with reference to the following drawings. The components in the drawings are not necessarily drawn to scale, the emphasis instead being placed upon clearly illustrating the principles of the present lens system. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
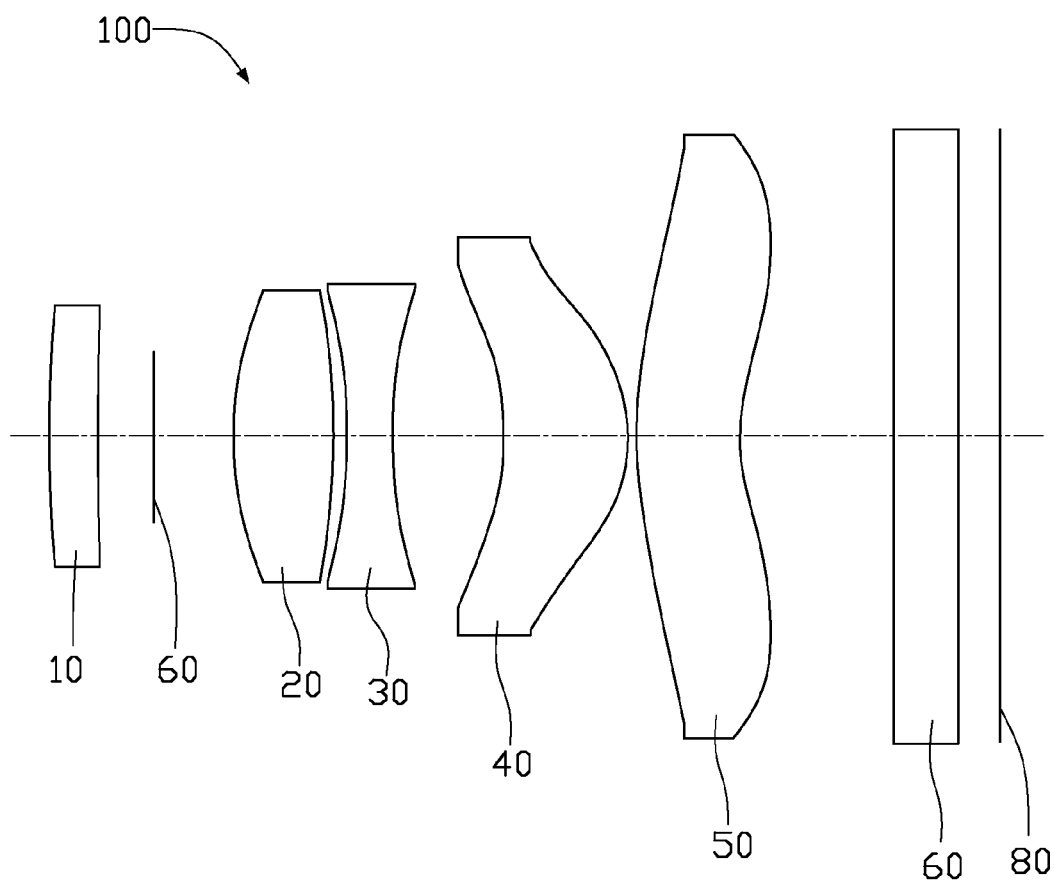
FIG. 1 is a schematic drawing of a lens system according to a first present embodiment.

Referring to FIG. 1, a lens system 100 according to a present embodiment is shown. The lens system includes, in order from an object-side to an image-side, a first lens 10 positive in power, a second lens 20 positive in power, a third lens 30 negative in power, a fourth lens 40 positive in power, and a fifth lens 50 negative in power.

Light coming from the object-side of the lens system 100 transmits through the first lens 10, the second lens 20, the third lens 30, the fourth lens 40, the fifth lens 50 and ultimately projects onto an image plane 80. A CCD or CMOS can be disposed in the image plane 80 for capturing an image in view of the lens system.

In order to provide the lens system 100 with a compact size and excellent optical performance, the lens system 100 meets the following conditions:

$$1.6<TT/f<1.8 \tag{1}$$

$$1.6<f/f_2<1.8; \text{ and} \tag{2}$$

$$-0.6<f/f_5<-0.4 \tag{3}$$

wherein TT denotes a distance between an object-side surface of the first lens and the image plane 80; $f_5$ denotes an effective focal length of the fifth lens 50; and f denotes an effective focal length of the entire lens system 100. Condition (1) defines a compact total length of the lens system 100 and condition (2) provides balance between total length, spherical aberration and chromatic aberration of the lens system 100. Condition (3) provides balance between total length and distortion of the lens system 100.

Preferably, the lens system 100 further meets the following condition $$1<f/f_4<1.3, \tag{4}$$

wherein $f_4$ denotes the effective focal length of the fourth lens 40. Condition (4) ensures the lens system 100 possesses a qualified dioptric strength and is nearly a telecentric optic system for providing uniform illumination of the image plane.

In order to correct chromatic aberrations of the lens system 100, especially the chromatic difference of magnification, the lens system 100 further meet the following condition:

$$Vd_2-Vd_3>15 \tag{5}$$

wherein $Vd_2$ denotes the Abbe number of the second lens 20 and $Vd_3$ denotes the Abbe number of the third lens 30. Condition (5) keeps the lens system 100 a balance between total length and the chromatic difference.

In order to install an aperture between the first lens 10 and the second lens 20, the lens system 100 further meet the following condition:

$$0.24<DA_{1-2}/f<0.3 \tag{6}$$

wherein $DA_{1-2}$ denotes a distance between the image-side surface of the first lens 10 and the object-side surface of the second lens 20; f denotes the focal length of the entire lens system 100.

The fifth lens 50 further meets the following condition:

$$FBL_5/f<0.46 \qquad (7)$$

wherein $FBL_5$ denotes a distance between an image-side surface of the fifth lens 50 and the image plane 80

The lens system 100 can further include an aperture stop 60 and a filter 70. The aperture stop 60 is installed between the first lens 10 and the second lens 20 and is configured for adjusting the light flux transmitted through the first lens 10 to the second lens 20. The aperture 70 ensures uniform light transmission through the first lens 10 to correct chromatic aberration of the lens system 100. To save on production cost and downsize the lens system 100, the aperture 60 can be formed by applying an opaque material on an outer rim of the object-side surface of the second lens 20. The filter 70 is installed between the fifth lens 50 and the image plane 80 and is configured for filtering out IR light that enters the lens system 100.

Preferably, the first lens 10, the second lens 20, and the third lens 30 in the lens system 100 can be made of glass. Meanwhile, the fourth lens 40 and the fifth lens 50 can be made of plastic to achieve better image quality but lower production cost.

Referring to FIGS. 2~10, embodiments of the lens system 100 are shown in the following. The first lens 10, the second lens 20, and the third lens 30 as shown in the following embodiments are all spherical lenses. The fourth lens 40 and the fifth lens 50 are aspheric lenses. By setting the center of the lens surface as an origin point, structure of the aspheric lenses can be expressed as:

$$x = \frac{ch^2}{1+\sqrt{1-(k+1)c^2h^2}} + \sum A_i h^i$$

wherein x is the length of a line drawn from a point on the aspheric lens surface at a distance h; $h=\sqrt{Y^2+Z^2}$ represents a distance from the optical axis to the tangential plane of the aspheric lens surface; c is the curvature of the aspheric lens surface; k represents a coefficient of the second-order term in the equation of the quadric surface, and $A_i$ is the aspheric surface coefficient of i-th order term for the surface.

In these embodiments, "f" represents a focal length of the lens system 100; "FNo" represents the aperture F-number; "2ω" represents a field angle.

Embodiment 1

The following table 1 and table 2 show specifications of a first embodiment of the lens system 100, wherein TT=11.64 mm; f=6.86 mm; $f_2$=3.918 mm; $f_5$=−13.262 mm; FNo=3.2; 2ω=58°.

TABLE 1

| Lens system 100 | Radius of curvature (mm) | Thickness (mm) | Refractive index | Abbe number |
|---|---|---|---|---|
| Object-side surface of the first lens 10 | 20 | 0.6 | 1.847 | 23.8 |
| Image-side surface of the first lens 10 | 40 | 0.68 | — | — |
| Aperture stop 60 | ∞ | 0.9848579 | — | — |
| Object-side surface of the second lens 20 | 4.660256 | 1.218602 | 1.835 | 42.7 |
| Image-side surface of the second lens 20 | −9.673459 | 0.1706635 | — | — |
| Object-side surface of the third lens 30 | −6.827207 | 0.35 | 1.805 | 25.4 |
| Image-side surface of the third lens 30 | 6.277945 | 1.372414 | — | — |
| Object-side surface of the fourth lens 40 | −3.574036 | 1.519003 | 1.5253 | 55.95 |
| Image-side surface of the fourth lens 40 | −1.894176 | 0.1 | — | — |
| Object-side surface of the fifth lens 50 | 4.335789 | 1.274355 | 1.5253 | 55.95 |
| Image-side surface of the fifth lens 50 | 2.402021 | 1.872747 | — | — |
| Object-side surface of the filter 60 | ∞ | 0.8 | 1.516 | 64.1 |
| Image-side surface of the filter 60 | ∞ | 0.5 | — | — |

TABLE 2

| Surface | Aspheric surface coefficients of the surface equation |
|---|---|
| Object-side surface of the fourth lens 40 | K = −0.629145; A4 = 0.000283365; A6 = −0.007896287; A8 = 3.68026E−03; A10 = −4.64809E−04; A12 = 1.78941E−05 |
| Image-side surface of the fourth lens 40 | K = −0.8988602; A4 = 0.00281701; A6 = 0.00117827; A8 = −8.30719E−04; A10 = 2.66314E−04; A12 = −1.86077E−05 |
| Object-side surface of the fifth lens 50 | K = −19.6134; A4 = −0.00440008; A6 = 0.00107469; A8 = −8.65362E−05; A10 = 2.07529E−06; A12 = 8.19722E−09 |
| Image-side surface of the fourth lens 50 | K = −7.431847; A4 = −0.001150747; A6 = 0.00064682; A8 = −2.24282E−06; A10 = −2.36763E−06; A12 = 7.82124E−08 |

Figure 2:
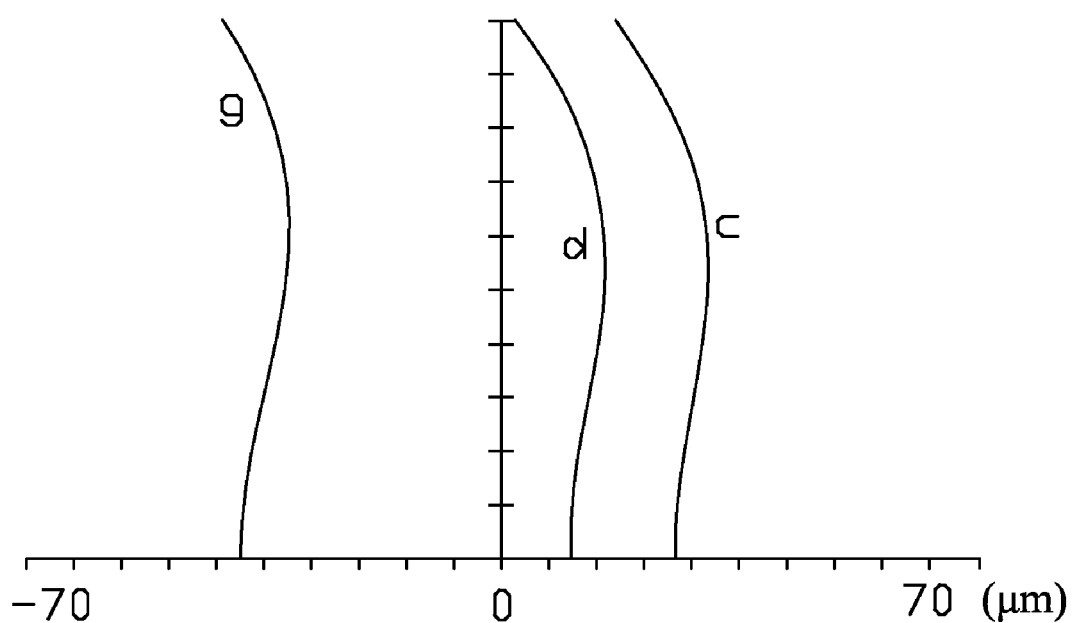
FIG. 2 is a spherical aberration diagram of the lens system in FIG. 1.
Figure 3:
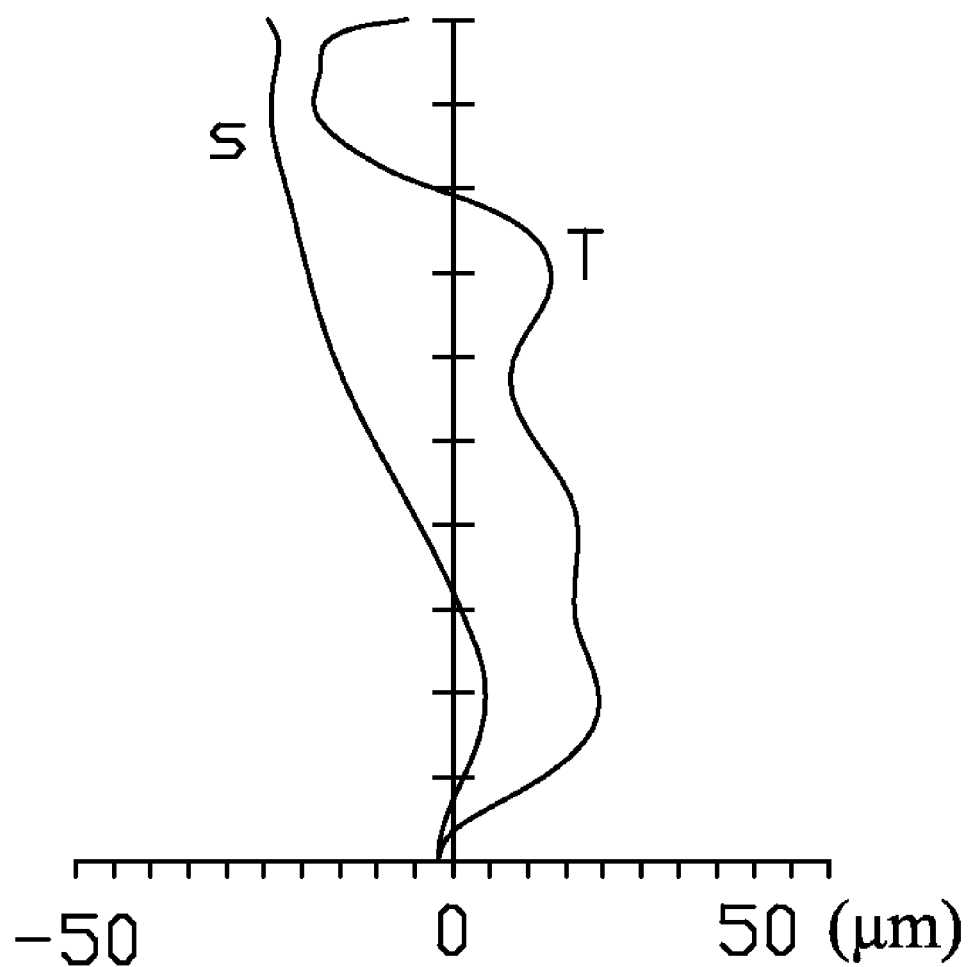
FIG. 3 is a field curvature diagram of the lens system in FIG. 1.
Figure 4:
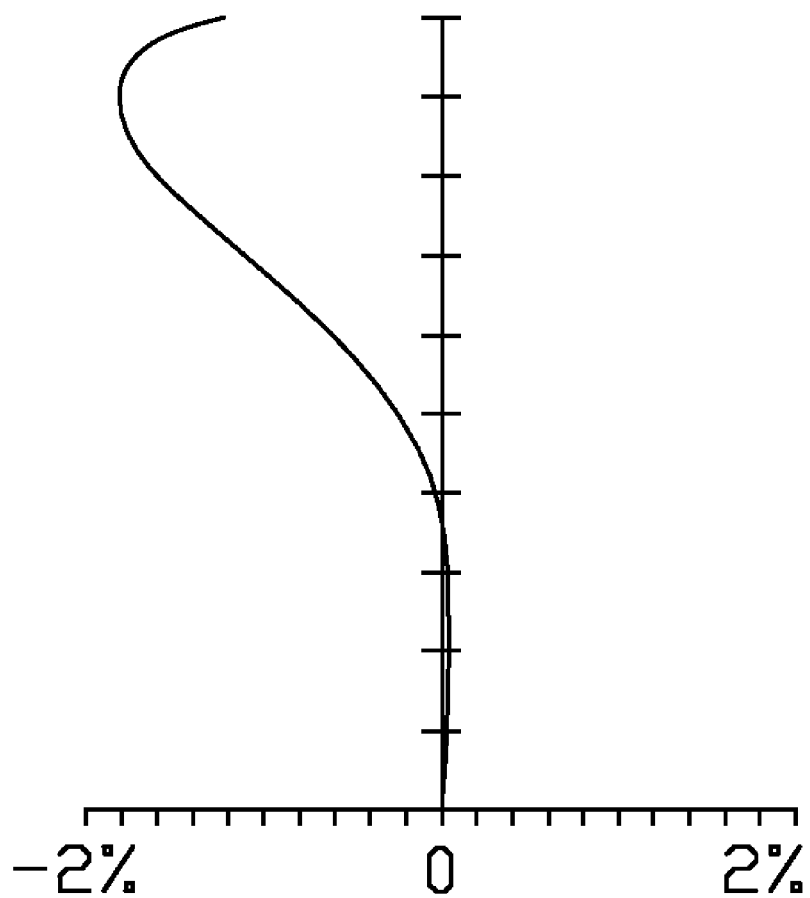
FIG. 4 is a distortion diagram of the lens system in FIG. 1.

The spherical aberration diagram, the field curvature diagram, and the distortion diagram of the lens system 100 are respectively shown in FIGS. 2~4. Spherical aberrations of line g (λ=435.8 nm) and line d (λ=587.6 nm) and line c (λ=656.3 nm) are shown in FIG. 2. Generally, spherical aberration of visible light (with a wavelength between 400~700 nm) of the lens system 100 in the first embodiment is within a range of −70 μm to 70 μm. The sagittal field curvature and tangential field curvature shown in FIG. 3 are kept within a range of −50 μm to 50 μm. The distortion in FIG. 4 falls within a range of −2% to 2%. Obviously, spherical aberration, field curvature, and distortion are well controlled in the first embodiment of the lens system 100.

Embodiment 2

The following table 3 and table 4 show specifications of a second embodiment of the lens system 100, wherein TT=11.675 mm; f=6.67 mm; $f_2$=3.785 mm; $f_5$=−16.293 mm; $F_{NO}$=3.2; 2ω=59.18°.

TABLE 3

| Lens system 100 | Radius of curvature (mm) | Thickness (mm) | Refractive index | Abbe number |
|---|---|---|---|---|
| Object-side surface of the first lens 10 | 32.26686 | 0.6123 | 1.8322 | 25.14 |
| Image-side surface of the first lens 10 | 64.64433 | 0.6654 | — | — |
| Aperture stop 60 | ∞ | 0.9775 | — | — |
| Object-side surface of the second lens 20 | 4.734222 | 1.248031 | 1.8315 | 43.1699 |
| Image-side surface of the second lens 20 | −8.26632 | 0.1923626 | — | — |
| Object-side surface of the third lens 30 | −5.695776 | 0.35 | 1.735201 | 27.5795 |
| Image-side surface of the third lens 30 | 6.476238 | 1.338504 | — | — |
| Object-side surface of the fourth lens 40 | −3.53409 | 1.546352 | 1.48749 | 70.4058 |
| Image-side surface of the fourth lens 40 | −1.848934 | 0.1 | — | — |
| Object-side surface of the fifth lens 50 | 3.87294 | 1.245206 | 1.503667 | 68.6849 |
| Image-side surface of the fifth lens 50 | 2.34782 | 1.899395 | — | — |
| Object-side surface of the filter 60 | ∞ | 0.8 | 1.516 | 64.1 |
| Image-side surface of the filter 60 | ∞ | 0.5 | — | — |

TABLE 4

| Surface | Aspheric surface coefficients of the surface equation |
|---|---|
| Object-side surface of the fourth lens 40 | K = −0.6734973; A4 = 0.000522885; A6 = −0.007918341; A8 = 0.003667617; A10 = −0.000465353; A12 = 1.86E−05 |
| Image-side surface of the fourth lens 40 | K = −0.8867163; A4 = 0.002429206; A6 = 0.001176508; A8 = −0.000848205; A10 = 0.000266894; A12 = −1.86E−05 |
| Object-side surface of the fifth lens 50 | K = −13.44202; A4 = −0.004722538; A6 = 0.001088901; A8 = −8.58E−05; A10 = 2.07E−06; A12 = 3.62E−09 |
| Image-side surface of the fourth lens 50 | K = −6.658952; A4 = −0.011869003; A6 = 0.000685275; A8 = −2.41E−06; A10 = −2.40E−06; A12 = 7.92E−08 |

Figure 5:
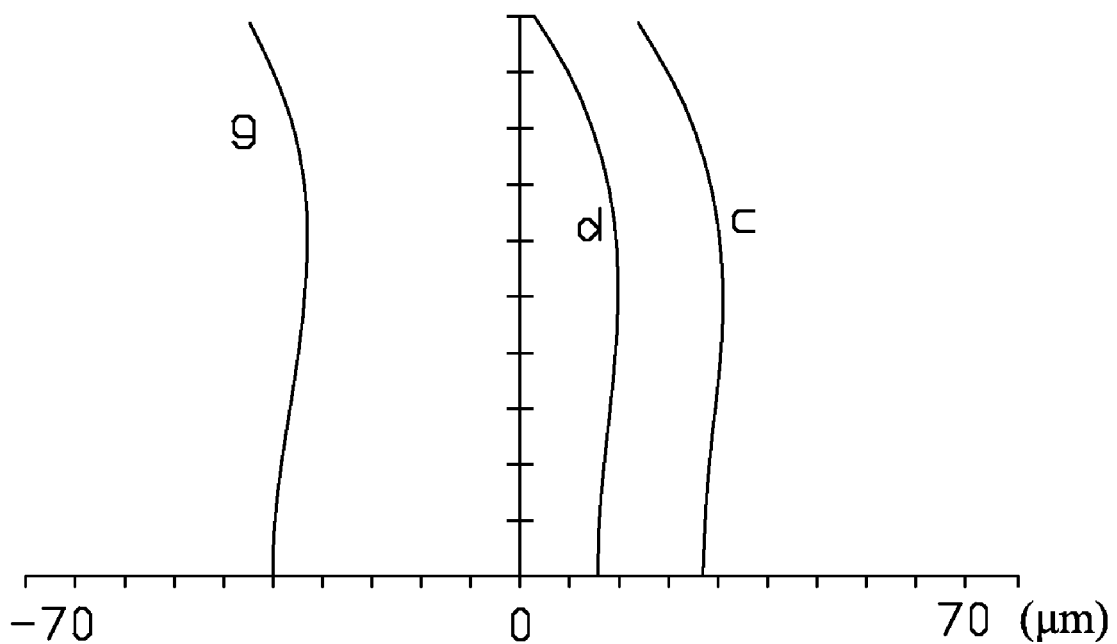
FIG. 5 is a spherical aberration diagram of the lens system according to a second present embodiment.
Figure 6:
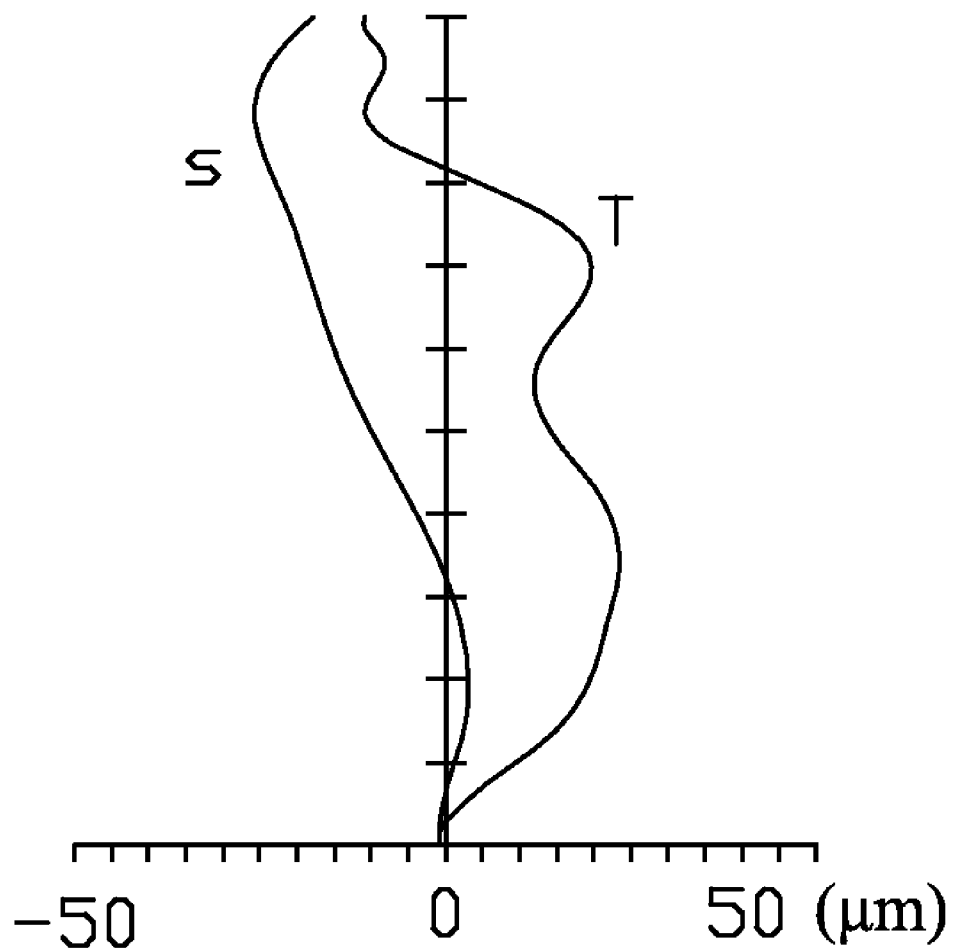
FIG. 6 is a field curvature diagram of the lens system according to the second present embodiment.
Figure 7:
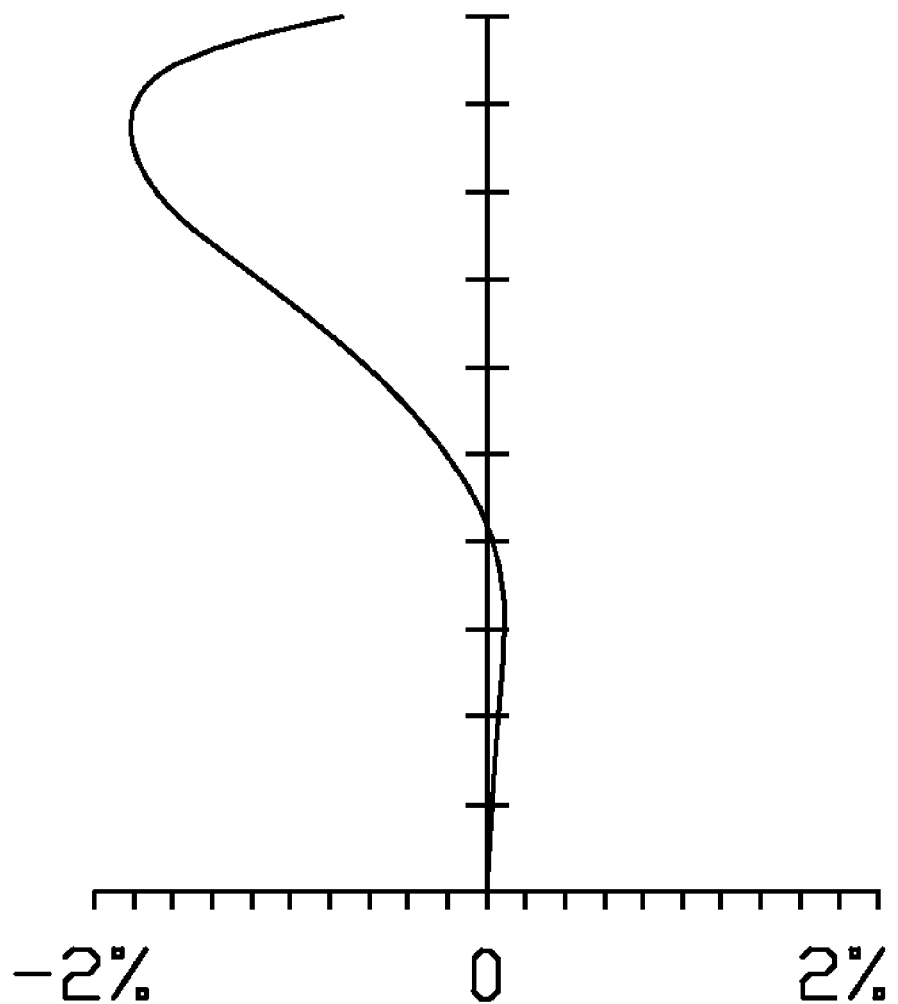
FIG. 7 is a distortion diagram of the lens system according to the second present embodiment.

The spherical aberration diagram, the field curvature diagram, and the distortion diagram of the second embodiment in the lens system 100 are respectively shown in FIGS. 5~7. Spherical aberrations of line g (λ=435.8 nm) and line d (λ=587.6 nm) and line c (λ=656.3 nm) are shown in FIG. 5. Generally, the spherical aberration of visible light (with a wavelength between 400~700 nm) of the lens system 100 in the second embodiment is kept within a range of −70 μm to 70 μm. The sagittal field curvature and tangential field curvature shown in FIG. 6 are kept within a range of −50 μm to 50 μm. The distortion shown in FIG. 7 falls within a range of −2% to 2%. Obviously, spherical aberration, field curvature, and distortion are well controlled in the second embodiment of the lens system 100.

Embodiment 3

The following table 5 and table 6 show specifications of a third embodiment of the lens system 100, wherein TT=11.47 mm; f=6.51 mm; $f_2$=3.968 mm; $f_5$=−11.485 mm; $F_{No}$=3.2; 2ω=60.4°.

TABLE 5

| Lens system 100 | Radius of curvature (mm) | Thickness (mm) | Refractive index | Abbe number |
|---|---|---|---|---|
| Object-side surface of the first lens 10 | 18.888 | 0.6421 | 1.8123 | 25.5689 |
| Image-side surface of the first lens 10 | 37.776 | 0.7 | — | — |
| Aperture stop 60 | ∞ | 0.952 | — | — |
| Object-side surface of the second lens 20 | 4.662901 | 1.207266 | 1.805 | 44.7 |
| Image-side surface of the second lens 20 | −8.971283 | 0.1724069 | — | — |
| Object-side surface of the third lens 30 | −6.399854 | 0.55 | 1.8123 | 25.5689 |
| Image-side surface of the third lens 30 | 6.999723 | 1.363556 | — | — |
| Object-side surface of the fourth lens 40 | −3.73191 | 1.476334 | 1.594884 | 61.7144 |
| Image-side surface of the fourth lens 40 | −1.933912 | 0.1 | — | — |
| Object-side surface of the fifth lens 50 | 3.975914 | 1.107187 | 1.623906 | 47.358 |
| Image-side surface of the fifth lens 50 | 2.283559 | 1.903675 | — | — |
| Object-side surface of the filter 60 | ∞ | 0.8 | 1.516 | 64.1 |
| Image-side surface of the filter 60 | ∞ | 0.5 | — | — |

TABLE 6

| Surface | Aspheric surface coefficients of the surface equation |
|---|---|
| Object-side surface of the fourth lens 40 | K = −0.4709513; A4 = −0.00016586; A6 = −0.007898677; A8 = 0.003663979; A10 = −0.00046653; A12 = 1.87E−05 |
| Image-side surface of the fourth lens 40 | K = −0.8916619; A4 = 0.002874988; A6 = 0.001026954; A8 = −0.00086664; A10 = 0.000266443; A12 = −1.83E−03 |
| Object-side surface of the fifth lens 50 | K = −16.81341; A4 = −0.005188043; A6 = 0.001120208; A8 = −8.48E−05; A10 = 2.09E−06; A12 = 1.29E−09 |
| Image-side surface of the fourth lens 50 | K = −7.204009; A4 = −0.011436668; A6 = 0.000691118; A8 = −2.77E−06; A10 = −2.39E−06; A12 = 8.23E−08 |

Figure 8:
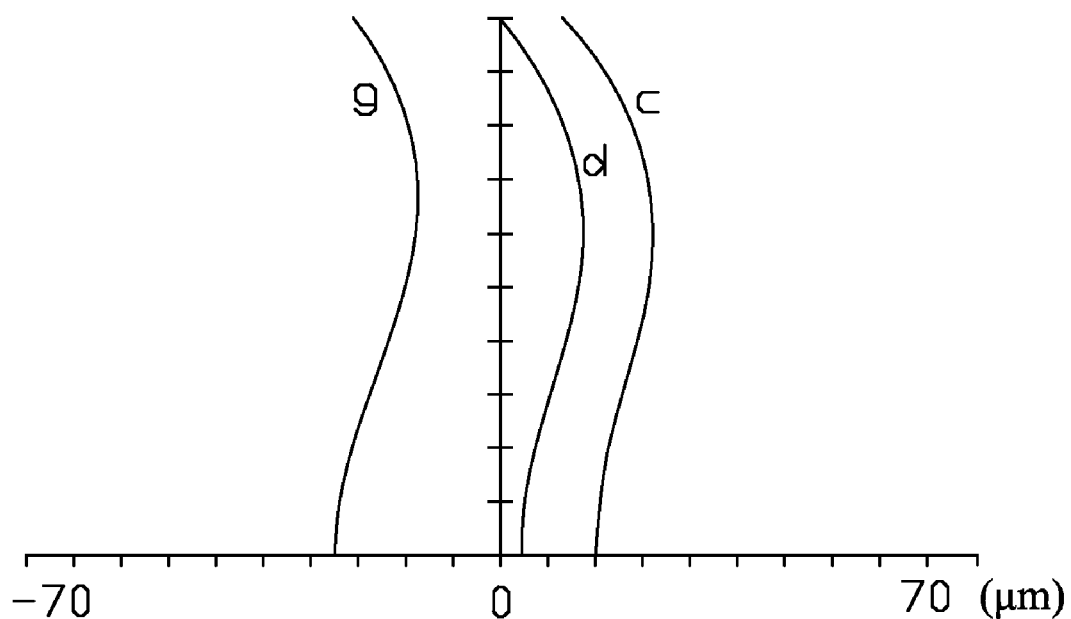
FIG. 8 is a spherical aberration diagram of the lens system according to a third present embodiment.
Figure 9:
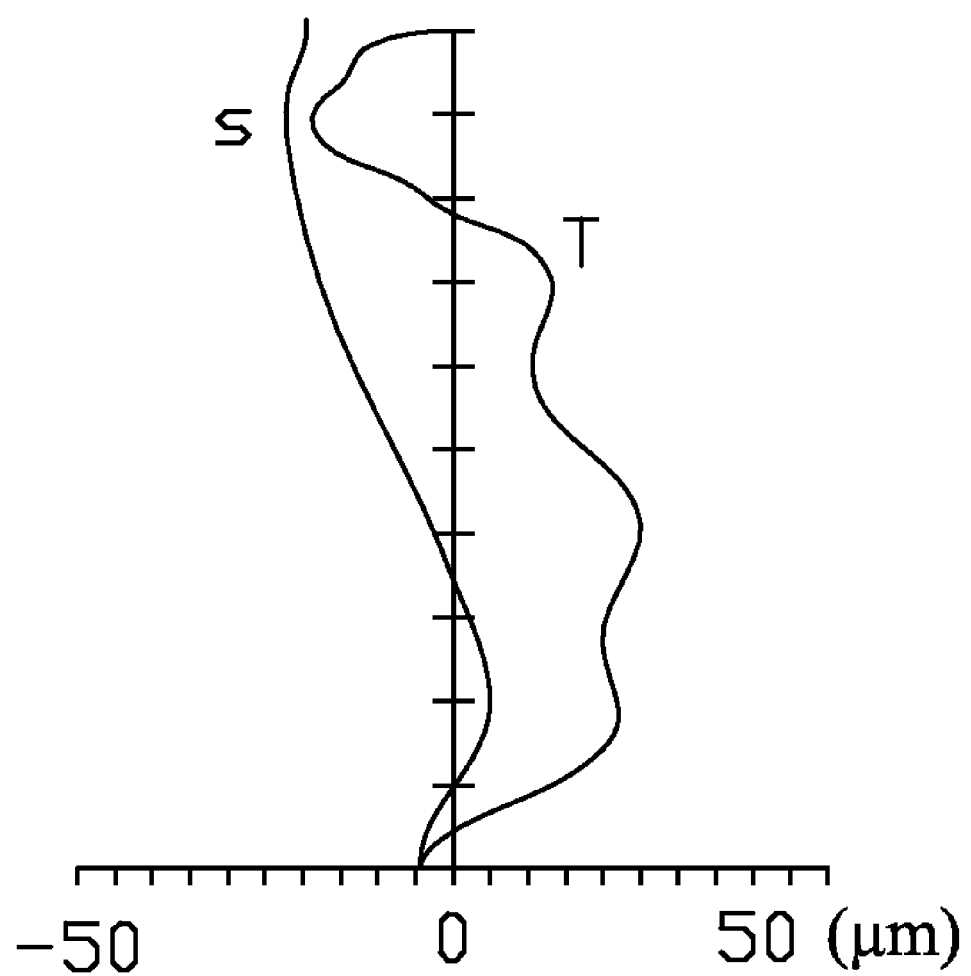
FIG. 9 is a field curvature diagram of the lens system according to the third present embodiment.
Figure 10:
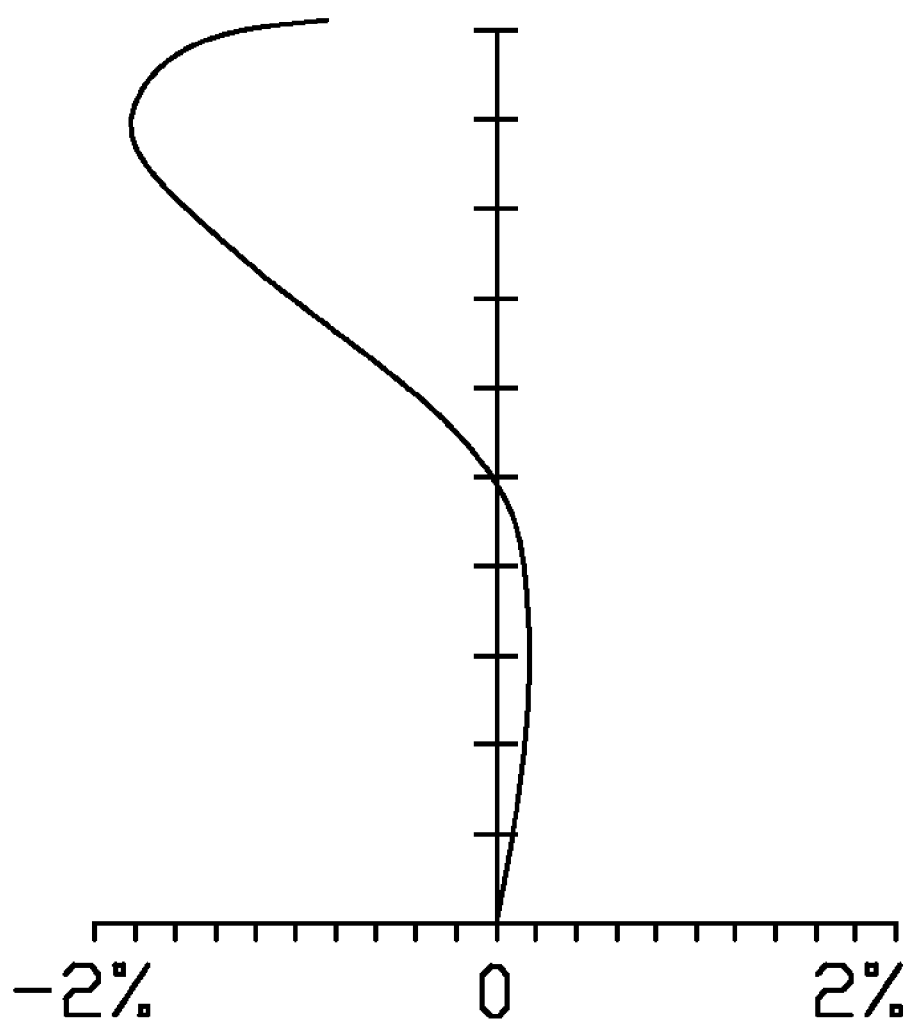
FIG. 10 is a distortion diagram of the lens system according to the third present embodiment.

The spherical aberration diagram, the field curvature diagram, and the distortion diagram of the third embodiment in the lens system 100 are respectively shown in FIGS. 8~10. Spherical aberrations of line g (λ=435.8 nm) and line d (λ=587.6 nm) and line c (λ=656.3 nm) are shown in FIG. 8. Generally, the spherical aberration of visible light (with a wavelength between 400~700 nm) of the lens system 100 in the third embodiment is kept within a range of −70 μm to 70 μm. The sagittal field curvature and tangential field curvature shown in FIG. 9 are kept within a range of −50 μm to 50 μm. The distortion shown in FIG. 10 falls within a range of −2% to 2%. Obviously, spherical aberration, field curvature, and distortion are well controlled in the third embodiment of the lens system 100.

The aforementioned lens system 100 has a compact size and excellent optical performance to meet the trend toward miniature lens systems. The lens system 100 works to keep chromatic aberrations at a minimum while reducing the total length of the lens system.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens system, from an object-side to an image-side of the lens system, comprising:
   a first lens positive in power,
   a second lens positive in power,
   a third lens negative in power,
   a fourth lens positive in power, and
   a fifth lens negative in power; the lens system meeting a criteria of $1.6<TT/f<1.8$, $1.6<f/f_2<1.8$, and $-0.6<f/f_5<-0.4$; wherein TT denotes a distance between an object-side surface of the first lens and an image plane of the lens system; $f_2$ denoting an effective focal length of the second lens; and f denoting an effective focal length of the entire lens system.

2. The lens system as claimed in claim 1, wherein the lens system meets a criteria of $1<f/f_4<1.3$ and $f_4$ denotes a focal length of the fourth lens.

3. The lens system as claimed in claim 1, wherein the lens system meets a criteria of $Vd_2-Vd_3>15$; $Vd_2$ denoting an Abbe number of the second lens 20 and $Vd_3$ denoting an Abbe number of the third lens 30.

4. The lens system as claimed in claim 1, wherein the lens system meets a criteria of $0.24<DA_{1-2}/f<0.3$ and $DA_{1-2}$ denotes a distance between an image-side surface of the first lens and an object-side surface of the second lens.

5. The lens system as claimed in claim 1, wherein the lens system meets a criteria of $FBL_5/f>0.46$; $FBL_5$ denoting a distance between an image-side surface of the fifth lens and the image plane.

6. The lens system as claimed in claim 1, further comprising an aperture stop installed between the first lens and the second lens.

7. The lens system as claimed in claim 6, wherein the aperture stop is formed by applying an opaque material on an outer rim of the object-side surface of the second lens.

8. The lens system as claimed in claim 1, wherein the first lens, the second lens, and the third lens are spherical lenses; the fourth lens and the fifth lens are aspheric lenses.

9. The lens system as claimed in claim 1, wherein at least one of the first lens, the second lens, and the third lens is made of glass.

10. The lens system as claimed in claim 1, wherein at least one of the fourth lens and the fifth lens is made of plastics.

11. The lens system as claimed in claim 1, further comprising a filter installed at an image-side of the fifth lens configured for filtering IR light.

* * * * *